United States Patent Office 3,443,446
Patented May 13, 1969

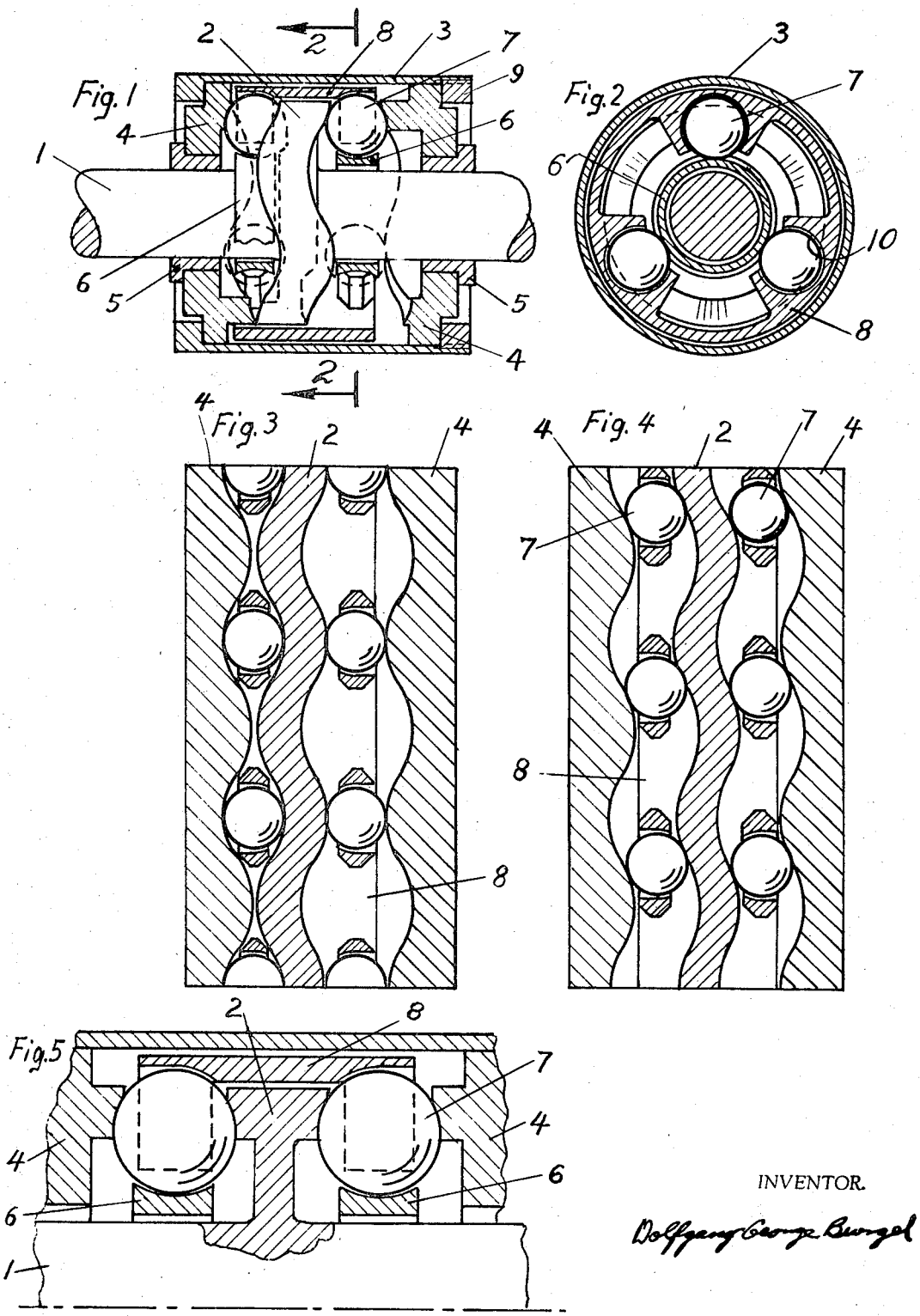

3,443,446
RECIPROCATING MOTION CREATING DOUBLE THRUST BALL BEARING
Wolfgang George Buergel, Fredonia, N.Y., assignor to George K. Buergel, Plainview, N.Y.
Filed Jan. 25, 1967, Ser. No. 612,758
Int. Cl. F16h 25/12
U.S. Cl. 74—56                                 4 Claims

ABSTRACT OF THE DISCLOSURE

A double thrust ball bearing device for translating rotary motion into reciprocating motion, including a housing and a shaft supported axially of the housing. The housing and shaft are associated with one another by means of a double thrust ball bearing arrangement, whereby the housing or the shaft is selectively reciprocable relative to the other accordingly as one or the other is held stationary. The ball bearing arrangement includes a floating cage coaxial with the shaft and surrounding a double wavy faced collar carried by the shaft. The cage carries two parallel rows of ball bearings, the balls in each of which have rolling contact with the races of a separate track defined by one wavy face of the collar and an opposed wavy surface of a race fixed in the housing. A separate floating ring coaxial with the shaft is centered between the balls of each row so as to afford a third contact for each of the balls of the row. The centers of the balls in each track are disposed closer to the axis of the shaft than the points of contact of the balls with opposed faces of the track.

---

The here presented invention relates to a mechanism, which transforms rotational motion into a reciprocating linear motion.

There are many mechanisms known which transform rotating into linear motion, for instance the crank and connecting rod or cams and cam followers or screws and nuts and so on, but all these mechanisms are relatively bulky.

Accordingly, it is the object of my invention to provide a relatively small but very powerful device, which transmits all forces over rolling members. It can be used to drive pistons as in pumps or it can be driven by pistons as in a compressed air- or steam- or combustion engine.

The device is built like a double thrust ball bearing. There are two stationary races, which are located in two parallel planes to which the shaft is perpendicular. The shaft carries a collar, which is located between these two races. The collar, which can be an integral part of the shaft is supported by several balls on each side which are equally spaced around the shaft. They are held in location by a common cage which always carries a pair or balls lined up in the direction of the shaft with the collar of the shaft locked between them.

The races and the collar of the shaft are not flat; they have a wavy surface and the collar has the shape of a wavy washer. If for instance there are waves in axial direction of the shaft on the first race, then there have to be identical waves on the second race. Both races have to be shaped and located with respect to each other so that a pair of balls, which are lined up parallel to the shaft have always just space enough to fit between the two races in all positions around the shaft. The number of waves can be selected for specific applications, it can be three, four, five and so on creating one and a half, two, two and a half and so on double strokes per rotation.

A collar which has to work between the races has to have the same number of waves and the waves have to be shaped so that the thickness of the collar always fits between the two balls which are lined up parallel to the shaft with a fixed distance between them. The height of each wave can be less than or equal to the radius of a ball.

The novel features, which are considered as characteristic of this invention are set forth in particular in the appended claims. The invention itself, however, both as to its construction and its method of operation, together with additional objects and advantages thereof, will be best understood from the following detailed description of a specific embodiment with reference to the accompanying drawings, in which:

FIG. 1 is an axial section through the bearing;
FIG. 2 is a section taken on line 2—2 of FIG. 1;
FIG. 3 is an unfolded cylindrical section cutting through the centers of all balls, where the balls are just in a valley or on the top of a wave respectively;
FIG. 4 is a section similar to that of FIG. 3, but shows the collar to have been turned for half a wave with respect to the opposed races, in which position the balls are on opposed straight portions of the waves; and
FIG. 5 illustrates the location of a pair of balls 7 with respect to the outer races 4, the races on both sides of the collar 2, the inner supporting race 6, and the cage 8.

Referring now in greater detail to the drawings and first to FIGS. 1 and 2, there is shown a shaft 1 which carries the collar 2, a housing 3, two identical outer races 4, two guidance bushings 5, two identical inner races 6, balls 7, a cage 8 and a nut 9. The guidance bushings 5 are not necessary for the function of the bearing, they can also be left out, if desired and be replaced by seals.

FIG. 3 shows the stretched out cylindrical section through the center of the balls 7. It shows the shape and location of the wavy races 4 and the waves of the collar 2 on the shaft 1. It shows the collar 2 in the left dead point position. The left balls 7 are locked in their position by the shape of the waves. The right balls 7 would be free to leave their location if they were not captured in the comon cage 8 together with the left balls 7, each ball is confined and rollable in a separate pocket 10 of the cage.

FIG. 4 shows a position of the collar 2 after it has turned for half a wave.

FIG. 5 shows the location of the balls 7 with respect to their races 4 and a third contact point, which is provided by a ring 6. By means of this arrangement each ball has three points of contact substantially in triangular array, one point of contact being with one of the races 4; a second, with an opposed wavy surface of the collar 2; and a third, with the periphery of one of the rings 6, which arrangement allows the balls 7 to rotate around their axes parallel to the shaft 1. There are other waveforms possible for the races, for instance waveforms which decrease high decelerations and accelerations at the end points of the stroke.

In the device illustrated, the housing 3 in which the races 4 are fixed is stationary so that upon relative rotation of the shaft, the opposed wavy surfaces or races of the collar will cooperate with the group of balls 7 at each side thereof and through the balls with the races 4 to translate the rotary movement of the shaft into reciprocating linear movement of the shaft. It is obvious from the drawings and the description above that either the shaft or the housing may be selectively caused to rotate relative to the other. It is apparent that upon holding the shaft stationary, the housing may be relatively rotated to cause linear reciprocating movement of the housing relative to the shaft. Accordingly, the device may be selectively employed to obtain, according to the use desired, either linear reciprocating movement of the shaft or of the housing.

What is claimed as new and desired to be secured by Letters Patent is:

1. A double thrust ball bearing device for translating rotary motion into reciprocating motion selectively of a housing or of a shaft supporting the housing, comprising: a housing, a pair of races fixed in the housing in opposed parallel spaced relation, each race being defined by an annular wavy surface in opposed parallel relation to that of the other, a shaft extending axially through the housing, bushing means carried by the housing supporting the shaft for relative axial movement of the shaft and housing to one another, a collar carried by the shaft disposed between the races having a pair of opposed parallel annular wavy faces, each face being disposed in opposed relation to the wavy surface of a separate one of the races so as to define a first ball track to one side of the collar and a second ball track to the other side of the collar, a floating cylindrical cage surrounding both ball tracks carrying a first group of balls angularly spaced equally apart about the shaft and having rolling engagement with the opposed surfaces of one of the ball tracks and carrying a second group of similarly arranged balls having rolling engagement with the opposed surfaces of the other ball track, a first floating ring coaxial with the shaft having a peripheral raceway in contact with each of the balls of the first group, a second similar floating ring similarly arranged with respect to the shaft and each of the balls of the second group, the shaft having rotation relative to the housing when the housing is held stationary so as to cause the opposed wavy surfaces of the collar to cooperate with the balls in the corresponding ball tracks and as a consequence impart reciprocating axial movement to the shaft relative to the housing, and the housing having rotation relative to the shaft when the shaft is held stationary so as to cause the wavy surfaces of the races of the housing to cooperate with the balls of the corresponding tracks and as a consequence impart reciprocating axial movement to the housing relative to the shaft.

2. A double thrust ball bearing device as in claim 1, wherein the balls of the first group are retained in the cage in parallel relation to the group of balls in the second group, and each ball in each group is axially aligned at all times with a separate ball in the other group, so that the axes of each pair of aligned balls lie in a line parallel to the axis of the shaft.

3. A double thrust ball bearing device as in claim 2, wherein each ball has in triangular array three points of contact, respectively with a wavy surface of one race, an opposed wavy surface of one face of the collar, and the peripheral surface of one of the floating rings.

4. A double thrust ball bearing device as in claim 3, wherein the points of contact are substantially equidistant so that the distance of the axis of rotation of each ball relative to the axis of the shaft is less than the radii of its points of contact with the related wavy surface of the related collar and the wavy surface of the related race.

References Cited

FOREIGN PATENTS 710,543   6/1954   Great Britain.

MILTON KAUFMAN, *Primary Examiner.*

U.S. Cl. X.R.

74—22